United States Patent [19]
Kaupp

[11] 3,880,811
[45] Apr. 29, 1975

[54] POLYIMIDES

[75] Inventor: Josef Kaupp, Aschaffenburg, Germany

[73] Assignee: Hoechst Aktiengesellschaft, Frankfurt am Main, Germany

[22] Filed: Apr. 17, 1972

[21] Appl. No.: 244,887

[30] Foreign Application Priority Data
Apr. 17, 1971 Germany............................ 2118690

[52] U.S. Cl..... 260/78 UA; 260/78 SC; 260/78.5 T; 260/830 P
[51] Int. Cl............................................ C08g 20/00
[58] Field of Search ............................... 260/78 UA

[56] References Cited
UNITED STATES PATENTS

| | | | |
|---|---|---|---|
| 2,313,565 | 3/1943 | McDowell...................... | 260/78 UA |
| 2,342,295 | 2/1944 | Orthner.......................... | 260/78 UA |
| 2,451,370 | 10/1948 | Alderson........................ | 260/78 UA |
| 2,456,177 | 12/1948 | Cupery............................ | 260/78 UA |
| 3,684,776 | 8/1972 | Field ............................... | 260/78 UA |
| 3,684,777 | 8/1972 | Field ............................... | 260/78 UA |
| 3,729,452 | 4/1973 | Andress ......................... | 260/78 UA |

*Primary Examiner*—Paul Lieberman
*Attorney, Agent, or Firm*—Littlepage, Quaintance, Murphy, & Dobyns

[57] ABSTRACT

A process for the preparation of a polyimide which comprises reacting a telomer of maleic acid or maleic anhydride and of at least one olefinically unsaturated monomer, with avoidance of substantial cross-linking, (a) with an excess of at least one polyamine, or (b) first partially with at least one monoamine and then with at least one polyamine.

7 Claims, No Drawings

POLYIMIDES

This invention concerns improvements in or relating to polyimides.

It has been proposed to react with polyamines alkenyl acid compounds such as alkenylsuccinic anhydrides which can be prepared e.g. from olefins and maleic anhydride. It has been proposed to use basic acid anhydrides so obtained for hardening epoxy resins.

It has also been proposed to react olefin-maleic anhydride copolymers with an excess of ethanolamine. The products obtained have in fact good properties, but it is desirable to improve their functionality.

One aspect of the present invention provides a process for the preparation of a polyimide wherein a telomer of maleic acid or maleic anhydride and of at least one olefinically unsaturated monomer is reacted, with avoidance of substantial cross-linking, with (a) an excess of at least one polyamine; or (b) first partially with at least one monoamine and then with at least one polyamine.

The products obtained are polyfunctional basic succinimides which, depending on the reaction conditions, contain a large number of primary and/or secondary amine groups in the molecule; they are of interest for use in paints and coatings.

The telomers containing the carboxylic or carboxylic anhydride group used as starting material have advantageously an average molecular weight of 400 to 3000, preferably 600 to 2500 and generally have on average between 0.08 and 1.5 carboxy groups, optionally in the form of carboxylic anhydride groups (each anhydride group naturally being counted as two carboxylic groups) in each case based on 100 molecular weight units. The telomers can be prepared by telomerisation with maleic anhydride of straight-chained or branched olefins, preferably mono-olefins with 2 to 9 C-atoms, e.g. ethylene, propylene, butylene or octene; vinyl monomers such as styrene, α-methylstyrene or the various vinyltoluenes; derivatives of acrylic or methacrylic acid, i.e. the esters, amides or nitriles thereof; or heterocyclic vinyl compounds such as vinylpyridine or vinylpyrrolidone. Advantageously, particularly in the case of styrene-maleic anhydride telomers, the ratio of maleic anhydride to olefin in the telomers is 1:0.5 to 1:20, preferably 1:1 to 1:12. Examples of suitable starting materials are the following telomers: 1) of styrene and maleic anhydride (molar ratios e.g. 1:1, 2:1, 3:1, 5:1 or 8:1); 2) of octene and maleic anhydride (molar ratio e.g. 1:1); and 3) of styrene, α-methylstyrene and maleic anhydride (molar ratio e.g. 1:1:2). The telomers 1) are preferred.

Suitable polyamines include aliphatic, cycloaliphatic and aromatic amines, e.g. ethylene-, propylene-, hexamethylene-, or 1,12-dodecylene-diamines, isophoronediamine (1-amino-3,3-dimethyl-5-aminomethyl-cyclohexane), phenylenediamine and xylylenediamine. Preferred amines include diethylenetriamine, triethylenetetramine and higher polyamines of this type.

To avoid a polycondensation, preferably the telomers are slowly added to the amine. In this reaction the polyamine can be in the form of a solution, preferably boiling, in aromatic or alcoholic solvents, e.g. benzene, toluene, xylene and/or further homologues, or higher alcohols such as butyl, amyl or 2-ethylhexyl alcohol. The telomer can also be used as a solution in the same solvents. During the reaction a homogeneous solution of the basic polysuccinimide is obtained accompanied by dehydration and without gel formation from which after distilling off the solvent and the excess amine the basic polysuccinimide is obtained as a solid resin.

According to one embodiment of the invention part e.g. 10 to 90% of the maleic acid or maleic anhydride groups of the telomer can be reacted prior to the reaction with the polyamine with aromatic and/or aliphatic (including cycloaliphatic and non-aromatic heterocyclic) monoamines. Cycloaliphatic amines are preferred to non-aromatic heterocyclic amines. This 2-stage process is in particular used if it is desired to keep the functionality of the basic resin products relatively low, and obtain more uniform products as regards the chemical structure. Suitable monoamines also include aminoalcohols and amino-phenols, wherein the amino group reacts more quickly than the hydroxy groups and therefore no esterification occurs. Suitable amines are e.g. methyl-, ethyl-, ethylhexyl-, nonyl-, dodecyl-, or octadecyl-amine; cyclohexylamine, mono- or diethanolamine, aminophenol, aniline and naphthylamine. When using readily volatile amines it is appropriate to perform the reaction under elevated pressure.

The process of the invention produces valuable resins with random reactivity which are suitable for various applications. The products are particularly suited for hardening epoxy resins. During the thermal hardening of paints and coatings based on epoxy resins one obtains strongly cross-linked and therefore very hard films with good technical properties. The resins produced according to the invention can also be used e.g. as binders for non-woven fabrics, for hair sprays, as thickening agents, paper sizes and sizing agents for textiles, as well as for the production of films and foils.

In order that the invention may be better understood, the following Examples are given by way of illustration.

EXAMPLE 1

1885 g of a telomer of styrene and maleic anhydride in the molar ratio 8:1 (acid number = 60) are dissolved with heating in 2000 g of xylene. This solution is slowly allowed to run into a boiling solution of 575 g of triethylenetetramine in 300 g of xylene over a period of 2 hours. A completely clear gel-free solution is obtained. Dehydration commences shortly after beginning admission of the telomer solution the xylene acting as an entrainer for the water liberated. When the theoretical quantity of water has been distilled over or the acid number has dropped below 1 the solvent and subsequently the excess triethylenetetramine is distilled off in vacuo.

There remain 2,028 g of a light resin of m.p. 105°C, acid number 0, amine number 139. The product obtained can be used as a hardener for epoxy resins.

EXAMPLE 2

500 g of a telomer as in Example 1 is dissolved with heating in 100 g of ethylhexyl alcohol. Then, over 30 minutes, 23 g of ethanolamine are added dropwise thereto. The mixture is kept boiling in a dehydrating apparatus until no more water is formed. Then 22.5 g of triethylenetetramine are admitted and the mixture is kept at boiling point until the acid number is practically 0.

After distilling off the solvent at 220°C in vacuo, 533 g of a light brown resin of m.p. 101° to 102°C, acid number 0, hydroxy number 7³ and amine number 15.4 are obtained. The resin is suitable as a hardener for coatings based on epoxy resins.

EXAMPLE 3

500 g of a telomer as in Example 1 are dissolved in 500 g of hot xylene. The solution is allowed to flow into a boiling solution of 200 g of hexamethylenediamine in 200 g of xylene. A gel-like addition product of diamine first separates, and as water formation progresses the gel gradually disappears and a clear solution is obtained. After about 4 hours an acid number of 0.8 is reached, whereupon the solvent and excess hexamethylenediamine are distilled off in vacuo. 522 g of a light resin of m.p. 97° to 98°C, amine number 50.4 are obtained. The product is suitable as a binder for nonwoven fabrics and as a hardener for epoxy resins.

It instead of hexamethylenediamine the equivalent quantity of isophoronediamine is used, one obtains a light resin of m.p. 122°C, acid number 0.7, amine number 38. Analogously with m-phylenediamine a resin with the following data is obtained, m.p. 105°C, acid number 0, amine number 94.

EXAMPLE 4

2,000 g of a telomer as in Example 1 are dissolved in a warm mixture of 500 g of amyl alcohol and 800 g of xylene. This solution is allowed to flow into a boiling solution of 500 g of diethylenetriamine in 500 g of amyl alcohol. Water is immediately formed. The clear solution reveals no signs of gel formation. The addition is complete after 30 minutes. The mixture is kept for 3 hours at boiling point.

After distilling off the solvent and excess diethylenetriamine in vacuo, 2159 g of a light yellow-brown resin are obtained of m.p. 102°C, acid number 0, amine number 142. The product is suitable for heat-hardening of epoxy resins.

EXAMPLE 5

2,000 g of a telomer as in Example 1 are heated to boiling with 500 g of ethylhexyl alcohol and 195 g of ethylhexylamine with separation of the water produced for about 3 hours, until no more water is formed. Then 100 g of isophoronediamine are allowed to flow into the reaction mixture and reaction proceeds with further dehydration until the acid number is close to 0.

After distilling off all volatile components at 200°C in vacuo, 2245 g of a light, yellow-brown resin of m.p. 95°C, acid number 2 and amine number 19.4 are obtained. The product is suitable for heat-hardening epoxy resins.

EXAMPLE 6

197 g of a telomer of styrene and maleic anhydride in the molar ratio of 4:1 (acid number 128) are dissolved in a hot mixture of 200 g of amyl alcohol and 200 g of xylene. This hot solution is allowed to flow slowly into 438 g of triethylenetetramine over a period of 30 minutes. The mixture is heated and at 145°C circulation distillation commences to remove the water formed. Distillation is continued for about 4 hours until no more water is formed and a final temperature of about 163°C is obtained.

After distilling off all volatile components at 220°C under a vacuum of 1 mmHg, 627 g of a light resin of m.p. 93°C, acid number 0, amine number 235 and a viscosity of 881 cP (50% in toluene/20°C) are obtained. It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What we claim is:

1. A process for the preparation of polyfunctional basic succinimides which contain I) pendant primary or or II) pendant primary and secondary amine groups in the molecule which comprises reacting A) the acid or acid anhydride groups of a telomer of a) maleic acid or maleic anhydride and b) at least one olefinically unsaturated monomer, said monomer of the telomer being 1) an aliphatic mono-olefin having 2 to 9 carbon atoms, 2) an aromatic or heterocyclic vinyl compound, or 3) an acrylic acid derivative selected from the group consisting of esters, amides and nitriles, with avoidance of substantial cross-linking, with B) an excess of at least one polyamine containing two primary amine groups, or C) first partially with at least one monoamine and then with an excess of at least one said polyamine, said telomer having an average molecular weight of 400 to 3000 and between 0.08 and 1.5 carboxy groups per 100 molecular weight units.

2. The process of claim 1 wherein the telomer is added to a solution of said polyamine in an aromatic or alcoholic solvent.

3. The process of claim 1 wherein the telomer is employed as a solution in an aromatic or alcoholic solvent.

4. The process of claim 1 wherein the telomer and the polyamine are employed as a solution in the same solvent of aromatic or alcoholic nature.

5. The process of claim 1 wherein 10 to 90% of the maleic acid or maleic anhydride groups in said telomer are reacted in a first step with a monoamine.

6. The process of claim 1 wherein the telomer is based on maleic anhydride and an olefin in a molar ratio of from 1:0.5 to 1:20.

7. The process of claim 1 wherein said monomer is a hydrocarbon with 2 to 9 carbon atoms having an olefinic bond.

* * * * *